United States Patent
Wang et al.

(10) Patent No.: US 10,402,313 B2
(45) Date of Patent: Sep. 3, 2019

(54) METHOD AND SYSTEM FOR ACCESSING A STORAGE SYSTEM WITH MULTIPLE FILE SYSTEMS

(71) Applicant: SanDisk Technologies LLC, Plano, TX (US)

(72) Inventors: Junzhi Wang, San Jose, CA (US); Alon Marcu, Tel-Mond (IL); Ori Stern, Modeen (IL); Susan A. Cannon, Santa Cruz, CA (US); Xian Jun Liu, San Jose, CA (US); Chieh-Hao Yang, Sunnyvale, CA (US); Po Yuan, Milpitas, CA (US)

(73) Assignee: SanDisk Technologies LLC, Plano, TX (US)

( * ) Notice: Subject to any disclaimer, the term of this patent is extended or adjusted under 35 U.S.C. 154(b) by 483 days.

(21) Appl. No.: 13/863,034

(22) Filed: Apr. 15, 2013

(65) Prior Publication Data
US 2013/0238844 A1    Sep. 12, 2013

Related U.S. Application Data (63) Continuation of application No. 12/101,569, filed on Apr. 11, 2008, now Pat. No. 8,423,592.

(51) Int. Cl.
*G06F 12/02* (2006.01)
*G06F 16/13* (2019.01)
(Continued)

(52) U.S. Cl.
CPC ......... *G06F 12/0246* (2013.01); *G06F 3/067* (2013.01); *G06F 3/0607* (2013.01);
(Continued)

(58) Field of Classification Search
CPC ............... G06F 17/30091; G06F 3/067; G06F 12/0246; G06F 16/13
(Continued)

(56) References Cited

U.S. PATENT DOCUMENTS 5,522,066 A * 5/1996 Lu .................................. 707/822
5,706,510 A * 1/1998 Burgoon ........... G06F 17/30067
                                                707/999.203
(Continued)

FOREIGN PATENT DOCUMENTS

EP       2270693 A1    1/2011
WO    WO 2009/125027 A1  10/2009

OTHER PUBLICATIONS

English translation of unpublished co-pending, PCT application No. PCT/ES2008/000235, filed Apr. 11, 2008.

*Primary Examiner* — Usmaan Saeed
*Assistant Examiner* — Brian E. Weinrich
(74) *Attorney, Agent, or Firm* — Brinks Gilson & Lione (57) ABSTRACT

In order to write data to a storage system accessible with a first and second file system, a manager receives a data write request associated with a file. The manager determines if a function supported by the second file system is needed to complete the write request. If so, the file is opened and extended with the first file system. The file is then opened and written to by the second file system. The file is truncated by the first file system, and closed by both file systems. If the second file system function is not needed, the file is opened, written, and closed by the first file system. In order to read data from a storage system using a function supported by the second file system, the second file system's cached storage system index is updated, and then the file is opened, read, and closed by the second file system.

24 Claims, 6 Drawing Sheets

(51) Int. Cl.
  *G06F 3/06* (2006.01)
  *G06F 16/18* (2019.01)
  *G06F 15/16* (2006.01)

(52) U.S. Cl.
  CPC .......... *G06F 3/0643* (2013.01); *G06F 3/0661* (2013.01); *G06F 3/0679* (2013.01); *G06F 16/13* (2019.01); *G06F 16/1847* (2019.01)

(58) Field of Classification Search
  USPC .......................................... 707/822; 711/101
  See application file for complete search history.

(56) References Cited

U.S. PATENT DOCUMENTS

| | | | |
|---|---|---|---|
| 5,819,276 A * | 10/1998 | Cai | G06F 17/30067 707/999.1 |
| 5,930,831 A * | 7/1999 | Marsh | G06F 3/0607 711/112 |
| 6,000,000 A | 12/1999 | Hawkins et al. | |
| 6,691,205 B2 | 2/2004 | Zilberman | |
| 6,694,317 B1 | 2/2004 | Stakutis et al. | |
| 7,228,377 B2 * | 6/2007 | Yamazoe et al. | 711/103 |
| 7,370,025 B1 | 5/2008 | Pandit | |
| 7,647,359 B1 * | 1/2010 | Taysom | G06F 17/30079 707/999.2 |
| 7,752,241 B1 | 7/2010 | Clarke et al. | |
| 7,774,391 B1 | 8/2010 | Le et al. | |
| 8,156,074 B1 * | 4/2012 | Multer | G06F 17/30174 707/610 |
| 2001/0051955 A1 | 12/2001 | Wong | |
| 2002/0138502 A1 * | 9/2002 | Gupta | G06F 17/30067 707/999.2 |
| 2002/0143734 A1 | 10/2002 | Loy et al. | |
| 2002/0188667 A1 * | 12/2002 | Kirnos | 709/203 |
| 2004/0044744 A1 | 3/2004 | Grosner et al. | |
| 2004/0243644 A1 | 12/2004 | Steere et al. | |
| 2005/0027949 A1 * | 2/2005 | Iwamori | G06F 9/5027 711/150 |
| 2006/0195672 A1 | 8/2006 | Inoue et al. | |
| 2007/0136509 A1 | 6/2007 | Agami | |
| 2009/0089343 A1 * | 4/2009 | Moore et al. | 707/999.205 |
| 2009/0172393 A1 * | 7/2009 | Tanik et al. | 713/160 |

\* cited by examiner

METHOD AND SYSTEM FOR ACCESSING A STORAGE SYSTEM WITH MULTIPLE FILE SYSTEMS

REFERENCE TO RELATED APPLICATION

This application is a continuation application of U.S. patent application Ser. No. 12/101,569, filed Apr. 11, 2008 (now U.S. Pat. No. 8,423,592), the entirety of which is hereby incorporated by reference herein.

TECHNICAL FIELD

This application relates generally to the operation of non-volatile flash memory systems, and, more specifically, to a method and system for accessing a storage system with multiple file systems.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. Some of the commercially available card formats include CompactFlash (CF) cards, MultiMedia cards (MMC), and Secure Digital (SD) cards. Hosts include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory in the card. Examples of this type of memory system include Smart Media cards and xD cards. Thus, control of the memory may be achieved by software (or firmware) on a controller in the card or by control software (or firmware) in the host. Besides a memory card implementation, this type of memory can alternatively be embedded into various types of host systems. In both removable and embedded applications, host data may be stored in the memory according to a storage scheme implemented by memory control software.

The memory control software may interface with a host file system, which, in turn, may interface with a memory file manager which provides an application programming interface (API) to applications accessing the memory. Host file systems may support a set of read and write commands to access storage systems connected to the host, may be optimized for the resource limitations or features of the host, and may include advanced features such as multi-thread support.

The feature set of a memory file manager communicating with the memory control software through a host file system may be limited by the command set, such as read and write commands, provided by the host file system interface. The limitations of the host file system interface may be a barrier to implementing a set of required features for accessing a memory storage system. A second challenge arises when attempts are made to overcome these limitations by supplementing a host file system with an additional, specialized file system, which may, alone or in combination with the host file system, implement all of the required features specific to accessing the memory. In particular, when a host file system and a specialized file system operate in parallel with one another their file system information needs to be synchronized.

SUMMARY

In order to address these issues, there is a need to improve coordinated access to a storage system by two separate file systems. Various embodiments are designed to address this need, examples of which are provided herein.

Thus, according to one embodiment, a method is provided for writing data to a storage system accessible by a manager directing a first file system and a second file system, where the first file system and the second file system are each capable of writing data to the storage system. The manager receives a data write request and data, where the data write request is associated with a file. The manager determines if a function supported by the second file system is needed to complete the write request. If the function supported by the second file system is needed to complete the write request, the manager instructs the first file system to open the file. The manager also opens the file with the second file system. The manager uses the second file system to write data to the file, and the size of the file is unchanged after the write. The manager closes the file with both the first and second file systems. If the function supported by the second file system is not needed to complete the write request, the manager opens, writes to, and closes the file with the first file system.

In a method of processing a data write request to a storage system which is accessible by a first file system and a second file system and is indexed by a storage system index. The manager receives a data write request and data, where the data write request is associated with a file. As before, the write request is evaluated to determine if a function supported by the second file system is needed to complete the write request. Then, if the function supported by the second file system is needed to complete the write request, the manager instructs the first file system to open the file, and the file is extended with the first file system to increase the size of the file. In this instance, a first cached storage system index associated with the first file system is updated to reflect the extended size of the file. The manager instructs the first file system to update the storage system index with information from the updated first cached storage system index. A second cached storage system index associated with the second file system is updated with information from the updated storage system index. The manager opens the file with the second file system, and data is written to the file with using second file system. The manager closes the file with the second file system. The file is then truncated by the manager using the first file system. The first cached storage system index is updated to reflect the extended size of the file. The manager closes the file with the first file system, and the storage system index is updated with information from the updated first cached storage system index.

Then again, if the function supported by the second file system is not needed to complete the write request, the manager opens, writes to, and closes the file using the first file system. The first cached storage system index is updated to reflect the written file. Finally, the storage system index is updated with information from the updated first cached storage system index.

According to another embodiment, in a method for processing a data write request to a storage system accessible with a first file system and a second file system, a manager receives a data write request and data, where the data write request is associated with a file. In this case, the manager extends the size of the file using the first file system. A first cached storage system index associated with the first file system is updated to reflect the extended size of the file. The storage system index is updated with information from the updated first cached storage system index. The second cached storage system index associated with the second file system is updated with information from the updated storage system index. Then, the manager instructs the second file system to write data to the file.

In yet another embodiment, there is a method of processing a read data request from a storage system accessible with a first file system and a second file system and indexed by a storage system index. In this method, a manager receives a read request, where the data read request is associated with a file. The read request is evaluated to determine if a function supported by the second file system is needed to complete the read request. If the function supported by the second file system is needed to complete the read request, the storage system index is updated with information from a first cached storage system index associated with the first file system. A second cached storage system index associated with the second file system is updated with information from the storage system index. The manager instructs the second file system to open the file, and the manager uses the second file system to read data from the file. The file is then closed by the manager using the second file system. If the function supported by the second file system is not needed to complete the read request, the manager instructs the first file system to open the file, read data from the file, and close the file.

In another embodiment, a system for writing data to a storage system includes a first file system, configured to write data to the storage system, a second file system, also configured to write data to the storage system and a manager. The manager can receive a data write request and data, where the data write request is associated with a file, and the file has a size, and can determine if a function supported by the second file system is needed to complete the write request. In response determining that the function supported by the second file system is needed to complete the write request, the manager instructs the first file system to open the file and extend the size of the file. The manager then instructs the second file system to open the file, write the data to the file, and close the file. The manager then instructs the first file system to close the file. The write of the data to the file with the second file system does not change the size of the file. If the manager determines that the function supported by the second file system is not needed to complete the write request, the manager then instructs the first file system to open the file, write the data to the file, and close the file.

According to another embodiment, a system for writing data to a storage system includes a first file system and a second file system, both configured to write data to the storage system, and a manager. The manager can receive a data write request and data, where the data write request is associated with a file. The manager can instruct the first file system to extend the size of the file, and update a first cached storage system index associated with the first file system to reflect the extended size of the file. The manager also can instruct the first file system to update a storage system index with information from the updated first cached storage system index. Finally, the manager can instruct the second file system to update a second cached storage system index associated with the second file system with information from the updated storage system index, and write the data to the file using the second file system.

Other embodiments, and features and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Applications in a system may need to write data to a storage system, and read data from a storage system. In many cases, a host file system provides the necessary Application Programming Interface (API) to perform all of the required operations, such as opening a file, reading file data, writing file data, and closing a file. One example of a file system API is the Win32 File I/O API, provided by Microsoft Corporation. The Win32 API supports a variety of read and write functions for reading and writing a file on a storage system.

Some applications require additional file I/O functionality not supported by a typical file system. For example, some application write and read requests may involve writing and reading data according to Digital Rights Management (DRM) rules established by the application, the storage system, or both. These rules may require that some data stored in a storage system, such as a non-volatile memory card, must be in an encrypted format. The DRM rules may also require that the data transmitted between the exemplary system and the storage system is in an encrypted format. These rules may also specify regions of the storage system where data stored must be in an encrypted format. In one example, the regions may be defined by address ranges within a non-volatile memory. In order to adhere to these DRM rules, an exemplary system may support additional functionality, such as encryption of data before storage and decryption of data after retrieval from the storage system. To accomplish this, a file system API must be capable of passing additional parameters through the file system in order to control the encryption and decryption functionality.

A system for encrypting data written to and decrypting data read from a storage system may appear in a variety of hosts, including personal computers, notebook computers, personal digital assistants (PDAs), various data communication devices, digital cameras, cellular telephones, portable audio players, automobile sound systems, and similar types of equipment. A storage system may be integrated into a host, such as a hard disk within a personal computer, or may be removable, such as a non-volatile memory card such as a Secure Digital (SD) card.

There are several architectures that may be utilized to implement a system that supports additional file system functionality, such as encrypting data written to, and decrypting data read from, a storage system such as a non-volatile memory.

Figure 1:
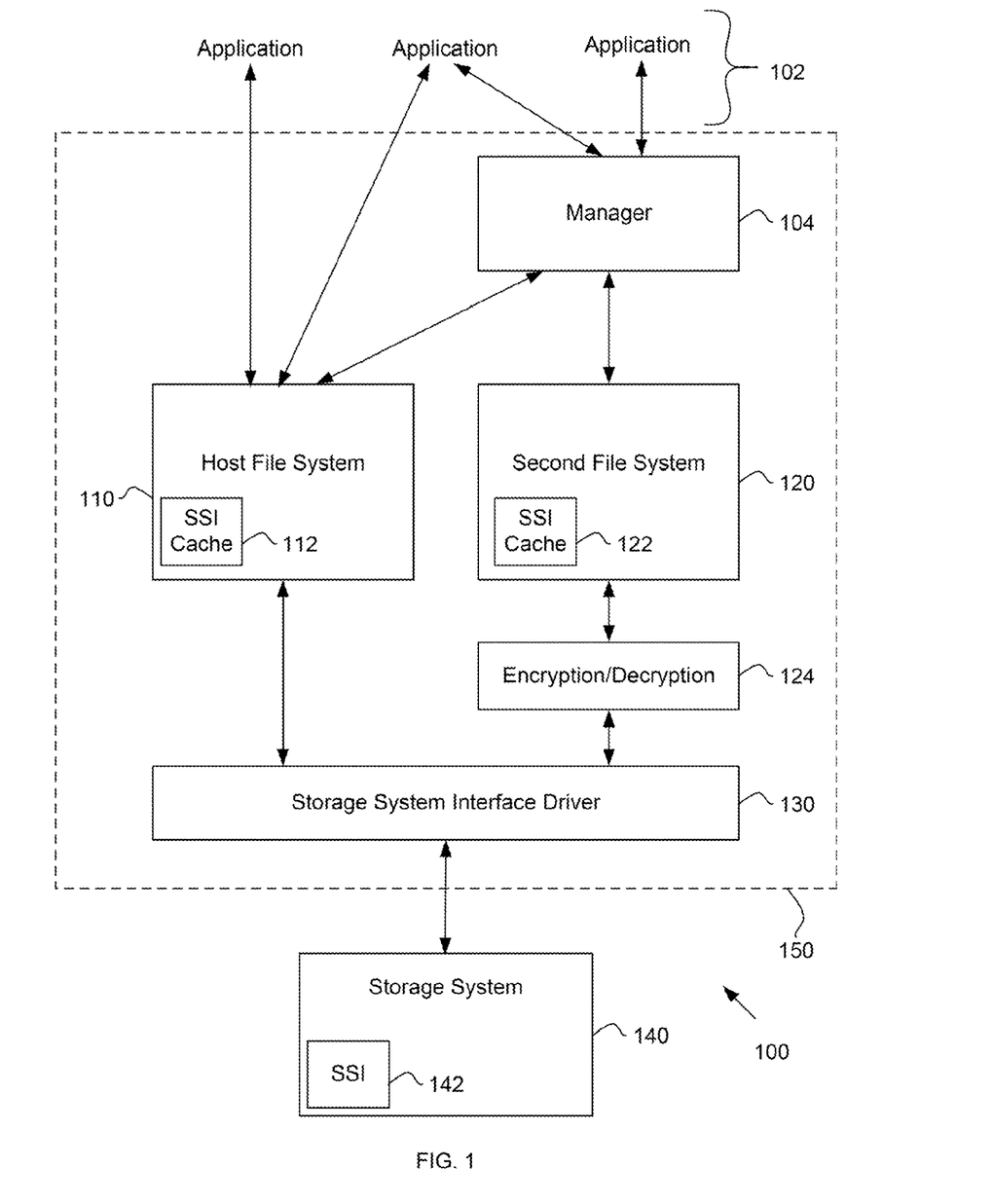
FIG. 1 is a diagram illustrating a system for accessing a storage system utilizing two file systems in parallel.

FIG. 1 is a diagram illustrating a system 100 for accessing a storage system utilizing two file systems in parallel. The system 100 may be implemented in hardware, software, or a combination of hardware and software. The system 100 comprises a storage system 140 and a host 150.

In one embodiment, a host 150 includes a manager 104, a first file system 110, a second file system 120, a storage system interface driver 130, and an encryption/decryption engine 124. The first file system 110 may be also referred to as a host file system. In another embodiment, the encryption/decryption engine 124 may be substituted with a module that implements a different specialized function in support of the second file system 120. In one embodiment, the host 150 also includes a plurality of applications 102 that are executed on a processor within the host 150. In another embodiment, the applications 102 are executed on a separate system in communication with the host 150. The manager 104, the first file system 110, the second file system 120, the storage system interface driver 130, and the encryption/decryption engine 124 may be implemented within the same functional block within the host 150, or within two or more functional blocks within the host 150. The host 150 may be implemented in hardware, software, or a combination of hardware and software, including utilizing a processor within the host 150 configured with processor executable instructions stored in a volatile or non-volatile memory within the host 150.

In one embodiment, the storage system 140 may be a solid-state disk drive, or a magnetic disk drive, sometimes referred to as a hard disk drive. In another embodiment, the storage system 140 may be a non-volatile memory such as a small form factor card. In one embodiment, the host 150 and the storage system 140 are contained within the same physical enclosure, and the storage system 140 is not removable from the system 100. In another embodiment, the storage system 140 is a removable media, such as a small form factor non-volatile memory card, and may be connected to and removed from the host 150 and the system 100. In this embodiment, the host is configured to receive a non-volatile memory card. Hosts that may receive a non-volatile memory card may include personal computers, notebook computers, personal digital assistants (PDAs), various data communication devices, digital cameras, cellular telephones, portable audio players, automobile sound systems, and similar types of equipment.

The data contained in the storage system 140 is organized by a storage system index 142. In one embodiment, the volume file system used by the storage system 140 is a FAT12, FAT16, or FAT32 system, and the storage system index includes a file allocation table (FAT). In this embodiment, the storage system index also includes additional information required to operate and maintain the storage system 140. This information may be stored outside of the file allocation table, and includes information such as directory information, file sizes, file creation and update dates, file and directory names, and file and directory attributes. Other embodiments may utilize other volume file system formats and their corresponding storage system indexes.

The applications 102 running on the host or in communication with a host may need to write data to and read data from the storage system 140. Some applications may only need the features of the file I/O API provided by the a first file system, such a host file system 110, and thus, may exclusively send file I/O commands to the host file system 110 in order to write data to and read data from the storage system 140. The host file system will accept file-level commands, and generate logical block address (LBA) commands used by the storage system device driver 130 to access the storage system 140.

Other applications 102 may require specialized file I/O functionality only supported by a second file system 120. For example, the encryption/decryption engine 124 may support encryption and decryption of file data written to and read from the storage system 140. The API of the second file system 120 may pass encryption and decryption parameters that may control the operation of the encryption/decryption engine 124. In contrast, the API of the host file system 110 is incapable of passing parameters needed to control the encryption/decryption engine 124.

When an application 102 needs to perform an encrypted write to a storage system, the application sends a request to a manager 104. A manager 104 may maintain encryption/decryption keys, and may otherwise manage the access to secure contents within the storage system 140. The manager 104 then sends a file-level write instruction, including encryption parameters, to the second file system 120. The second file system 120 may generate logical block address (LBA) write commands used by the storage system device driver 130 to access the storage system 140. Additionally, the second file system 120 may pass encryption parameters used to configure the encryption/decryption engine 124, so that the data associated with the logical block address write commands is encrypted by the storage system device driver 130 before being stored in the storage system 140.

Similarly, an application 102 may read encrypted data from the storage system by sending a request to the manager 104. The manager 104 then sends a file-level read instruction, including decryption parameters, to the second file system 120. The second file system 120 may generate logical block address (LBA) read commands used by the storage system device driver 130 to access the storage system 140. Additionally, the second file system 120 may pass decryption parameters used to configure the encryption/decryption engine 124, so that the data returned from the storage system 140 in response to the logical block address write commands is decrypted before being returned through the second file system 120 and manager 104 to the application 102.

The manager 104 may be implemented in hardware, firmware, software, or any combination thereof, arranged to implement the functionality of the manager, such as the functionality described in the embodiments of FIGS. 1-6, and the accompanying text. In one embodiment, the manager 104 is implemented utilizing a processor within the host 150 configured with processor executable instructions. The processor executable instructions may be stored in random access memory (RAM) within the host 150, or non-volatile memory within the host, such as a read-only memory (ROM), EEPROM (Electrically Erasable and Programmable Read Only Memory), E-flash (embedded flash).

The applications 102 may transmit requests to and receive data from the manager by function calls to functions supported by the application programming interface (API) of the manager 104. In another embodiment, the manager 104 and the applications 102 may communicate through a hardware communications interface. Similarly, the manager 104 may instruct the host file system 110 and the second file system 120 to perform file operations by sending file-level requests in the form of function calls to functions supported by the application programming interfaces of the host file system 110 and the second file system 120. In another embodiment, the manager 104 instructs the host file system 110 and the second file system 120 through a hardware communication interface to perform file operations.

In this architecture, implementing a second file system 120 allows a system 100 to support specialized file I/O functionality not supported by a host file system 110. However, operating a host file system 110 in parallel with a second file system 120 presents synchronization issues that must be addressed in order to ensure correct operation of the system. Specifically, the two cached copies 112, 122, of the storage system index 142 used by the host file system 110 and the second file system 120, respectively, may not always accurately reflect the contents of the storage system 140. If the cached storage system indexes 112, 122 are not kept up to date, a write operation utilizing obsolete information from a cached storage system index may corrupt the contents of the storage system 140.

The storage system index (SSI) 142 acts as an index for the data stored in the storage system 140. The storage system index 142 information is utilized to map file-level read or write operations to logical block address read or write operations. Additionally, a storage system index 142 may contain directory information, file sizes, file creation and update dates, file and directory names, and file and directory attributes, and other information required to operate and maintain a storage system 140. When data is written to the storage system 140, the storage system index 142 may updated with the location of the new data. Writing a new file, erasing a file, appending data to an existing file, or overwriting an existing file with a new, larger file, are all examples of file write operations that will require an update to the storage system index 142. In contrast, the storage system index 142 does not require updating after a read operation, because the location of the stored data is unchanged. Similarly, if a storage system supports overwriting data with new data, sometimes referred to as a "write in place", the storage system index 142 will not require an update if a file is overwritten with a file of the same size, because the location of the stored data is unchanged.

In order to improve the performance of the system 100, a file system may store a cached copy of the storage system index 142 within the host. When a file system performs a write operation, the cached copy is updated. However, the actual storage system index 142 may not be updated every time the cached storage system index is updated, in order to improve performance. Rather, the storage system index 142 may be updated after two or more write operations have been completed. When a system contains only one cached copy of a storage system index 142, maintaining a cached copy is an efficient means of improving system performance.

As illustrated, however, the system 100 contains two cached copies 112, 122 of a storage system index 142. One cached storage system index 112 is utilized by the host file system 110, and the second cached storage system index 122 is utilized by the second file system 120. If a write operation using the host file system 110 causes its cached storage system index 112 to be updated, the second cached storage system index 122 is obsolete. If second cached storage system index 122 is not updated, a subsequent write operation using the second file system will corrupt the contents of the storage system 140. Similarly, if a write operation using the second file system 120 causes its cached storage system index 122 to be updated, the host cached storage system index 112 is obsolete. If the host cached storage system index 112 is not updated, a subsequent write operation using the host file system will corrupt the contents of the storage system 140.

Synchronization of the host cached storage system index 112 and the second cached storage system index 122 is important to prevent corruption the storage system 140. The host file system cached storage system index 112 may not be directly accessible to a host application 130 or the host processor, which may prevent synchronization by direct copying of storage system index information between the host file system cached storage system index 112 and the second cached storage system index 122. Synchronizing the cached storage system indexes by copying the data to and from the storage system index 142 is inefficient. For example, updating the second cached storage system index 122 by first copying the host file system cached storage system index 112 to the storage system index 142, then copying the storage system index 142 to the second cached storage system index 122, is time-consuming. If this synchronization process is performed once per write access to the storage system, the data bandwidth of the storage system 140 may be greatly reduced.

In one embodiment, the need for synchronization operations may be reduced by utilizing the host file system 110 to perform certain file operations (such as extending a file or creating a new, empty file) for the second file system 120. The second file system 120 does not perform file operations that may cause a change in the second cached storage system index 122, such as allocating new space or additional space for a file.

Rather, the second file system 120 relies on the first file system 110 to perform these operations on its behalf. Once the first file system 110 allocates the required file space, the second file system 120 may perform a write to the allocated file space, an operation which will not trigger a change the second cached storage system index 122. Thus, the host file system cached storage system index 112, and the storage system index 142, may not become obsolete because of file I/O operations of the second file system 120. This may reduce or eliminate the need to update the host file system cached storage system index 112 before a file I/O operation using the host file system 110. The host file system 110 may continue to be utilized for file I/O operations that do not require the use of a second file system 120.

The second cached storage system index 122 must be updated after the host file system 110 creates or extends a file for the second file system 120. However, by utilizing the host file system 110 to extend a file by a predetermined amount, the second file system 120 may perform one or more write operations to a file before the file needs to be extended again, thus reducing the number of synchronization operations required.

Figure 2:
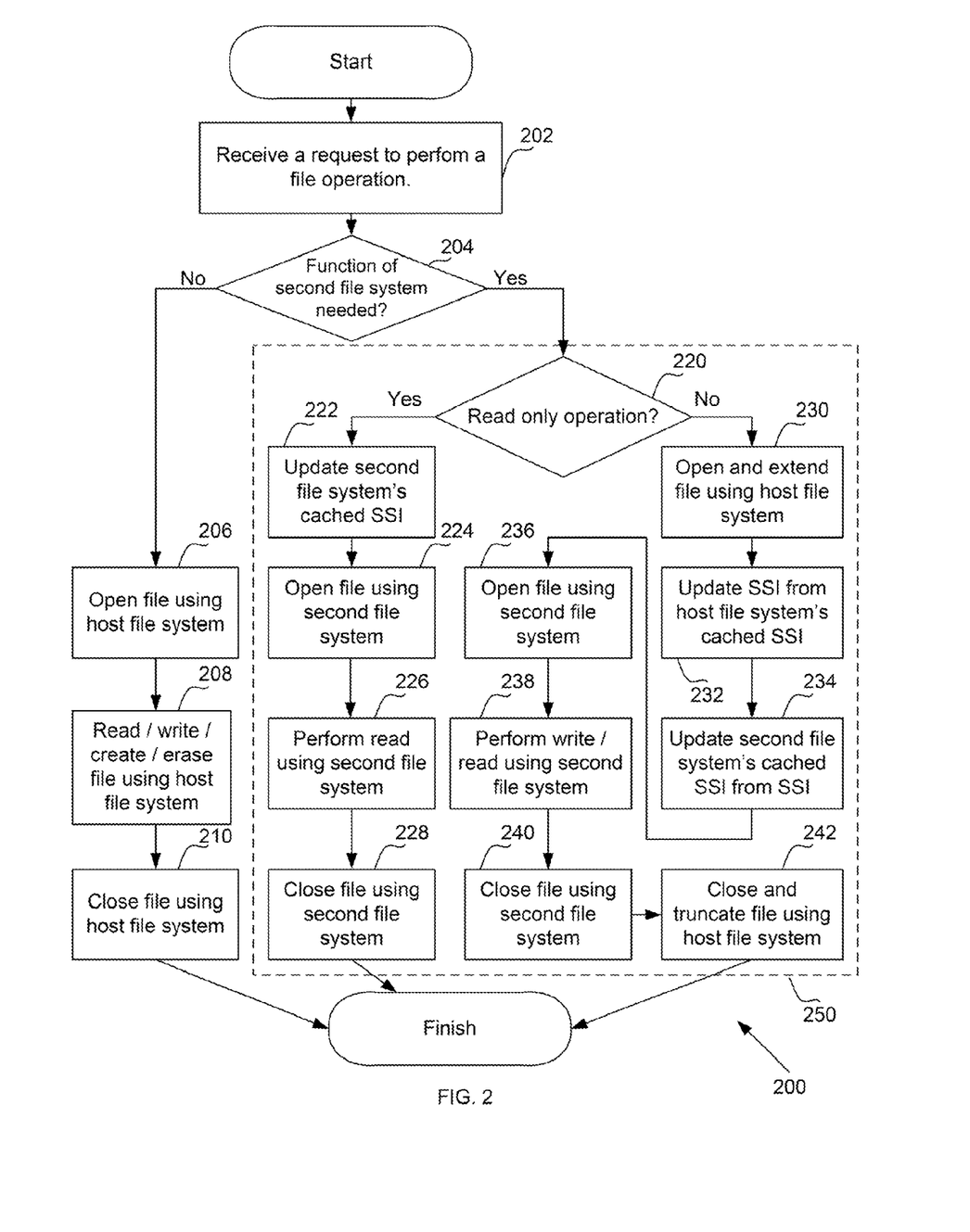
FIG. 2 shows exemplary steps for processing a write request received by the manager of FIG. 1.

FIG. 2 shows exemplary steps for processing a write request received by the manager of FIG. 1. In step 202, the manager 104 of FIG. 1 receives a file access request from an application 102. The manager 104 then evaluates the nature of the file I/O request in step 204. Specifically, the manager 104 determines if the functionality of the second file system (such as encryption/decryption) is required. In one embodiment, the functionality of the second file system is not required when the requested operation is to create or erase a file. In this case, the host file system is utilized to create or erase the file. In another embodiment, the functionality of the second file system is not required to extend or truncate a file. In this embodiment, the host file system may be utilized to open, extend, and close a file. Similarly, the host file system may be utilized to open, truncate, and close a file. In yet another embodiment, the functionality of the second file system is not required to change a file attribute, such as whether a file is read-only. In this embodiment, the host file system may be utilized to change the file attribute. If the request does not require the functionality (such as encryption/decryption) of the second file system, then control passes to step 206, where the manager calls a function of the host file system in order to open the file. In step 208, the manager directs the host file system to read, write, create, or erase the file, depending on the request received in step 202. At step 210, the file is closed by the host file system, and the application request is completed.

The functionality of the second file system is required, for example, if a request is received for an encrypted write or decrypted read. In this situation, control passes from step 204 to step 220. At step 220, the type of file I/O operation is evaluated again. If a read-only access is requested, the application will only read data from the file. In this situation, the storage system indexes will not be modified by the request, because a read access does not change the size, location, or existence of a file. If the access is not read-only, then the application is accessing a file for read/write or write-only operations. In this case, the access may modify a storage system index, because the size or location of a file may change because of the operation.

If the access is read-only, control passes from step 220 to step 222, where the second file system's cached storage system index is updated with the current state of the storage system media. Referring briefly to FIG. 1, this step may require updating the second cached storage system index 122 with information from the host cached storage system index 122 and/or the storage system index 142. At step 224, the manager directs the second file system to open the file. Control passes to step 226, where the second file system is used to perform the read operation. At step 228, the file is closed by the second file system, and the application request is completed.

Referring briefly to FIG. 1, an application 102 may directly access the host file system 110. Additionally, in some systems, the manager 104 may simultaneously support access requests by the host file system 110 and the second file system 120. In these situations, the host file system 110 should be prevented from being able to delete the file while it is being read utilizing the second file system 120 in the steps 222-228. In one embodiment, the host file system 110 may be blocked from deleting a file that is open. Thus, the manager 104 may first open the file in step 222 using the host file system 110, and may close the file in step 228 using the host file system 110.

If the access is write only or read/write, control passes from step 220 to step 230, where the manager calls the host file system to open and extend the size of the file to accommodate the upcoming write to the file. If the access is to a file that does not exist, the file is created first, and then opened. The host file system's cached version of the storage system index is copied to the storage system index of the storage system in step 232. At step 234, the updated storage system index contained in the storage system is used to update the second file system's storage system index. Effectively, the combination of steps 232 and 234 causes the second file system's cached storage system index to become synchronized with the host file system's cached storage system index.

At step 236, the manager directs the second file system to open the file. Control passes to step 238, where the second file system is used to perform the write operation or a combination of write and read operations. Because the file size was extended in step 230, the write operation in step 238 should not trigger an update to the second file system's cached version of the storage system index. If the file size extension is small, or if a large amount data is written in step 238, then the extended file size is insufficient. If this occurs, the file must be extended again, and the storage system indexes must be updated again, before the write is attempted again. At step 240, the file system is closed by the second file system. Control passes to step 242, where the host file system closes the file, and truncates the file to eliminate unused space allocated during the file extension in step 230. The application request is then complete.

Figure 3:
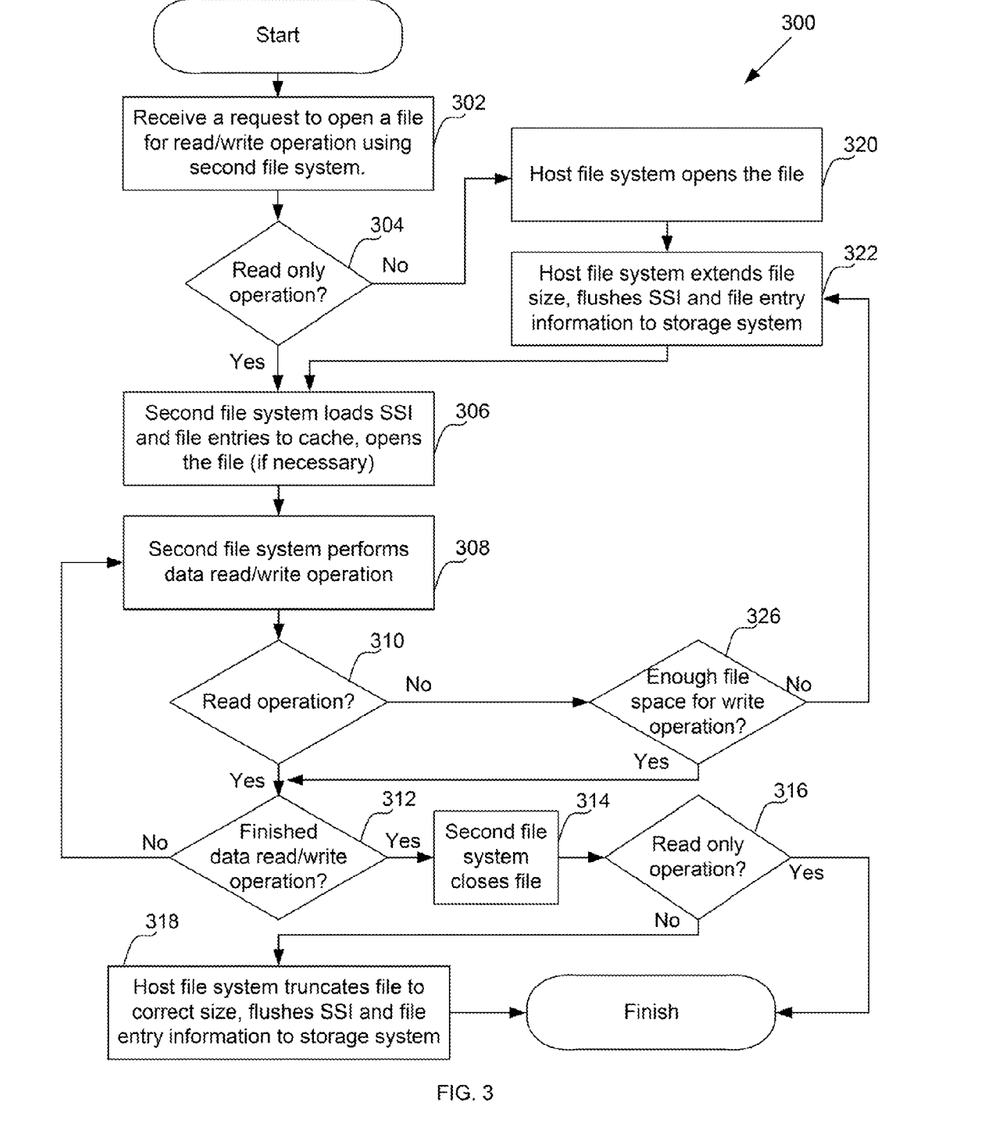
FIG. 3 shows exemplary steps for using a second file system to perform read and write operations with assistance from a host file system.

FIG. 3 shows exemplary steps 300 for using a second file system to perform read and write operations with assistance from a host file system. The steps 300 are a further elaboration of the steps 250 of FIG. 2, where the manager has determined that a functionality of the second file system is required to process the request. Control begins at step 302, where a request is received to open a file for a read or write operation, where the second file system will be utilized to read or write the data. Referring briefly back to FIG. 1, the manager 104 may receive the request from an application 102 to perform the read or write operation. The host file system may be utilized to erase a file or create a file, as shown in step 208 of FIG. 2. Thus, the file may be accessed utilizing the second file system for three reasons: 1) a read-only operation 2) a write-only operation or 3) a combination of writes and reads to one file. Returning to FIG. 3, at step 304, the type of access request is evaluated.

If the request is for a read-only operation, control passes to step 306, where the second file system updates its cache of the storage system index 122, including directory information, from the storage system index 142 of the storage system 140. In this step, it is assumed that the storage system index 142 contains the up-to-date index of the contents of the storage system 140. If the host cached storage system index 112 contains the most current index, then information from the host cached storage system index 112 must be used to update the storage system index 142, before the update of the second cached storage system index 122 takes place. When the update is complete, control passes to step 308, where the second file system performs the data read operation from the storage system 140. Because the operation is a data read operation, control passes to step 310 and then to step 312, where the manager 104 determines whether the data read operation is finished. If the manager 104 has received an additional request to read more data from the same file, control passes back to 308 to perform an additional read utilizing the second file system. Returning control to step 308 avoids the overhead associated with opening and closing a file a second time for the additional read operation from the same file. If the read operation is finished and there are no pending requests to read more data from the file, then control passes from 312, to step 314 where the file is closed, then through step 316, and finally to the completion of the steps 300.

If the request at step 302 is for a write operation, or a combination of read and write operations, control passes to from step 304 to step 320, where the manager 104 directs the host file system 110 to open the file, or create a new file and then open the created file if the file does not exist in the storage system 140. Control passes to step 322, where the host file system 110 extends the size of the opened file. The size of the extension can be a predetermined number of bytes, such as one megabyte, that may accommodate one or more write operations. The size of the predetermined extension may be a constant. Alternatively, the size of the extension may be a value that differs for each cycle through the loop of steps 322, 306, 308, 310, 326, and 322. In one example, a file is extended by one megabyte, then by two megabytes, and then by one megabyte. The file may contain zero data bytes before it is extended. This situation may occur if a file is created, but no data has been written to the file, or if the file is truncated to contain zero data bytes.

In another embodiment, the file size may be extended by the number of bytes necessary to accommodate the new size of the entire file after the write operation or operations are complete. In this case, the size of the extension is the difference in size between the existing and new (or modified) file. For example, if an existing file is two megabytes, and the received request is to write a file of four megabytes, then the size of the extension is two megabytes. In this embodiment, extension size is based on the anticipated amount of data to be written. Thus, the extension occurs before the first write operation.

In yet another embodiment, the extension size is the number of bytes necessary to accommodate the write request. In this embodiment, the file is opened by the manager 104, and the manager may accommodate several separate requests to write the file that has already been opened. In this situation, the file is extended to accommodate the new size of the modified file after one write request is completed, and the file may be extended (and written to) a number of times before the file is closed.

The extension of the file in step 322 triggers the host cached storage system index 112 to be updated with information about the extended file, including its storage location and its new size. The host file system 110 is instructed to flush or copy the updated information from host cached storage system index 112 to the storage system index 142 in the storage system.

Control passes to step 306, where the second file system updates its cache of the storage system index 122, including directory information, from the storage system index 142 of the storage system 140. After this step, the second cache of the storage system index 122 contains updated information about the file resized in step 318. The second file system then opens the file, and in step 308, the second file system performs the data read or write operation to the file. The data read or write operation in 308 does not trigger an update to the second cached storage system index 122, because the operation does not increase the size of the file. If enough space is not available, the write fails, and the file will be extended again step 322 before the write is attempted again. Therefore, the host cached storage system index 112 is not made obsolete by a write operation using the second file system to perform a write operation in step 308.

If the operation completed is a write operation, then control passes from step 310 to step 326, where the algorithm checks if sufficient file space was allocated for the write operation. If not, then control passes to step 322, where the host file system extends the file again, and copies updated storage system index information from the cache of the storage system index 122, including directory information, to the storage system index 142 of the storage system 140. Control then passes to steps 306, followed by 308, where the second file system updates the second cache of the storage system index 122 and attempts to complete the write operation.

If there was sufficient file space for the write operation, control passes to step 312, where the manager 104 determines whether the data read/write operation is finished. If the manager 104 has received an additional request to write data to or read data from the same file, control passes back to 308 to perform an additional read/write operation utilizing the second file system. Returning control to step 308 avoids the overhead associated with opening and closing a file a second time for the additional read operation from or write operation to the same file. If the last operation is finished and there are no pending read or write requests for the same the file, then control passes from 312, through step 314, where the second file is closed. Control them passes to step 316, and then to step 318, because the request received at step 302 was not a read-only file request. At step 318, the host file system truncates the file to eliminate any extra space that was allocated to the file when the file was extended in step 322, but that remained unused after the write operation in step 308.

The truncation of the file in step 318 triggers the host cached storage system index 112 to be updated with information about the truncated file, including its storage location and its new size. The host file system 110 is instructed to flush or copy the updated information from host cached storage system index 112 to the storage system index 142 in the storage system. After this update, the steps 300 are finished.

Other embodiments of the file extension algorithm are possible. In one embodiment, the extension of the file in step 322 utilizes information about the file size that will result once the pending write operation is complete, and extends the file so that there is always at least sufficient file space to complete the pending file write operation. In this embodiment, control passes from step 308 to step 312, then to step 326 if there is a subsequent pending file access request. If there is another pending file access request, in step 326, the file may be extended again if the pending request is a file write request and if there is not at least sufficient file space to complete the next file write operation.

Utilizing the steps 300 in FIG. 3, a manager 104 may receive a request to write a file, where the operation requires the use of the second file system 120. In response to this request, the manager 104 may utilize the host file system 110 to extend the file before the write, and truncate the file to the correct size after the write. The manager 104 may utilize the second file system 120 to actually transfer the data to the storage system 140. By dividing the tasks associated with the application request, the manager 104 may ensure that the host file system 110 performs all of the operations that would require an update to the storage system index 142. Therefore, the host cached storage system index 112 is not at risk of becoming obsolete because of a file I/O operation utilizing the second file system 120. The second cached storage system index 122 may be updated from the storage system index 142 before data is written to or read from the storage system 140. However, inspection of steps 300 reveals that this synchronization operation occurs only once when a read-only operation is requested, and only once per file extension event when a write operation is requested. Further, if the predetermined file extension size increased, the number of required of file extension events may be decreased, because two or more file write requests may be performed before another file extension is needed to accommodate additional write data.

In order to implement the steps 300 in FIG. 3, a host file system must have a minimum required functionality. Specifically, a manager must be able to command the host file system to 1) open or create a file, 2) close a file, 3) extend a file, 4) truncate a file, and 5) copy the host cached storage system index and associated file information to a storage system storage system index.

The Win32 API is capable of implementing all of the required functions. The host file system can open or create a file using the CreateFile function:

HANDLE WINAPI CreateFile(_in LPCTSTR lpFileName, _in DWORD dwDesiredAccess, _in DWORD dwShareMode, _in_opt LPSECURITY_ATTRIBUTES lpSecurityAttributes, _in DWORD dwCreationDisposition, _in DWORD dwFlagsAndAttributes, _in_opt HANDLE hTemplateFile);

The host file system can close a file using the CloseHandle function:

BOOL WINAPI CloseHandle(_in HANDLE hObject);

The host file system can extend or truncate a file by first setting a file pointer associated with an opened file using the SetFilePointer function, then setting the location pointed to by the file pointer as the end of the opened file using the SetEndOfFile function.

DWORD WINAPI SetFilePointer(_in HANDLE hFile, _in LONG lDistanceToMove, _inout opt PLONG lpDistanceToMoveHigh, _in DWORD dwMoveMethod);

BOOL WINAPI SetEndOfFile(_in HANDLE hFile);

All of the information associated with a file, including the file size directory information, may be copied from the host cached storage system index 112 to the storage system index 142 in the storage system 140 by calling the FlushFileBuffers function, then closing the file using the CloseHandle function:

BOOL WINAPI FlushFileBuffers(_in HANDLE hFile);
BOOL WINAPI CloseHandle(_in HANDLE hObject);

The API of other host file systems typically provides functionality equivalent to the functions shown for the Win32 API. Thus, the steps 300 in FIG. 3 may be implemented with a variety of host file systems and operating system environments. Further, the steps 300 may be implemented in hardware, software, or a combination of hardware and software.

Figure 4:
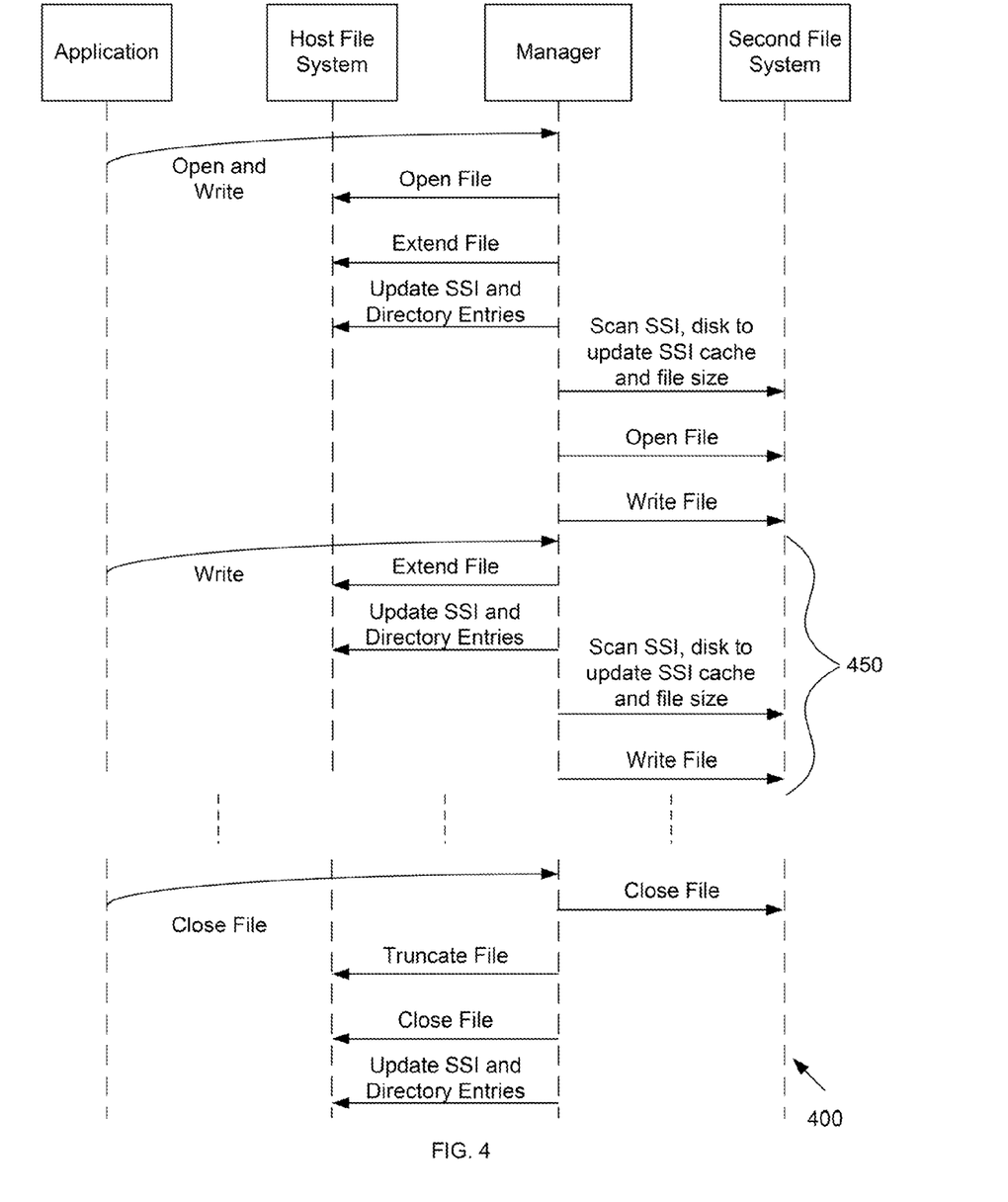
FIG. 4 shows an exemplary sequence of software function calls when a second file system is used to perform a write operation with assistance from a host file system.

FIG. 4 shows exemplary sequence 400 of software function calls when a second file system is used to perform a write operation with assistance from a host file system 110. An application such as the application 102 of FIG. 1 sends a request to the manager, such as the manager 104 in FIG. 1, to open a file for a write operation. If the access is to a file that does not exist, the file is created first, and then opened. The request may be sent in the form of a function call. The manager 104 may evaluate the request and determine that the request requires the use the second file system 120, because the write operation may utilize a specialized functionality of the second file system 120 such as data encryption. In this situation, the host file system 110 may assist the second file system 120 in completing the write operation.

The manager 104 sends a request to the host file system 110 to open the file, or create the file if it does not exist. Then the manager 104 sends a request to the host file system 110 extend the size of the file. The size of the extension may be a predetermined, fixed amount, or it may be a size based on information provided by the application in the write request, such as the size of the file to write, or the difference in size between the existing file and the file after the write operation is complete. The file extension may cause the host file system's cache 112 of the storage system index and directory information to be updated. Therefore, the host file system 110 may contain a cached copy 112 of the storage system index and directory information that is newer than the corresponding information stored in the storage system 140. The manager 104 sends a request to the host file system 110 to copy the updated storage system index and directory information to the storage system's storage system index 142.

The copying operation may be referred to as "flushing" the cached information to the storage system 140. Depending on the API exported by the host file system 110, this operation may be performed in one or more function calls. As explained above, if the host file system 110 is the Win32 API, a function call is needed to flush the buffered file information, then the host file system 110 must close the open file in order to update the directory information, such as the size of the file that was extended. If a close file function call is required in order to complete the operation, the file may then be re-opened before continuing.

If the second file system 120 stores a cached copy 122 of the storage system storage system index and directory information, then the manager 104 may send a request to the second file system 120 may update its cached information using information from the storage system 140. The manager 104 then requests the second file system to open the file, and write information to the file. In the file open or file write requests, the manager 104 may pass other configuration information to the second file system, such as parameters that are needed to configure the encryption/decryption engine 124 of FIG. 1. The file write operation by the second file system 120 may not update or modify the second file system's cached copy 122 of the storage system index or directory information.

When the write operation is complete, the manager 104 may check if the application has sent additional requests to write to the file. If it has, then the steps 450 of extending the file, updating the storage system index 142 and directory information in the storage system 140, updated the second file system's cache 122 of the storage system index and directory information, and writing the file, are repeated. The file may be kept open, and the steps 450 may be repeated, when additional file write requests have been received by the manager 104 from the application.

If there are no further requests pending, the application may then direct the manager 104 to close the file. The manager 104 then sends a request for the second file system 120 to close the file. The host file system 110 then truncates the file. The file truncation operation may eliminate the space that was allocated to the file by one or more file extension operations, but that remained unused after the file write operations were complete. Because the truncation changes the host file system's cached storage system index 112 information about the file, the manager 104 instructs the host file system 110 to flush the updated cached information to the storage system 140 after the file is closed.

Figure 5:
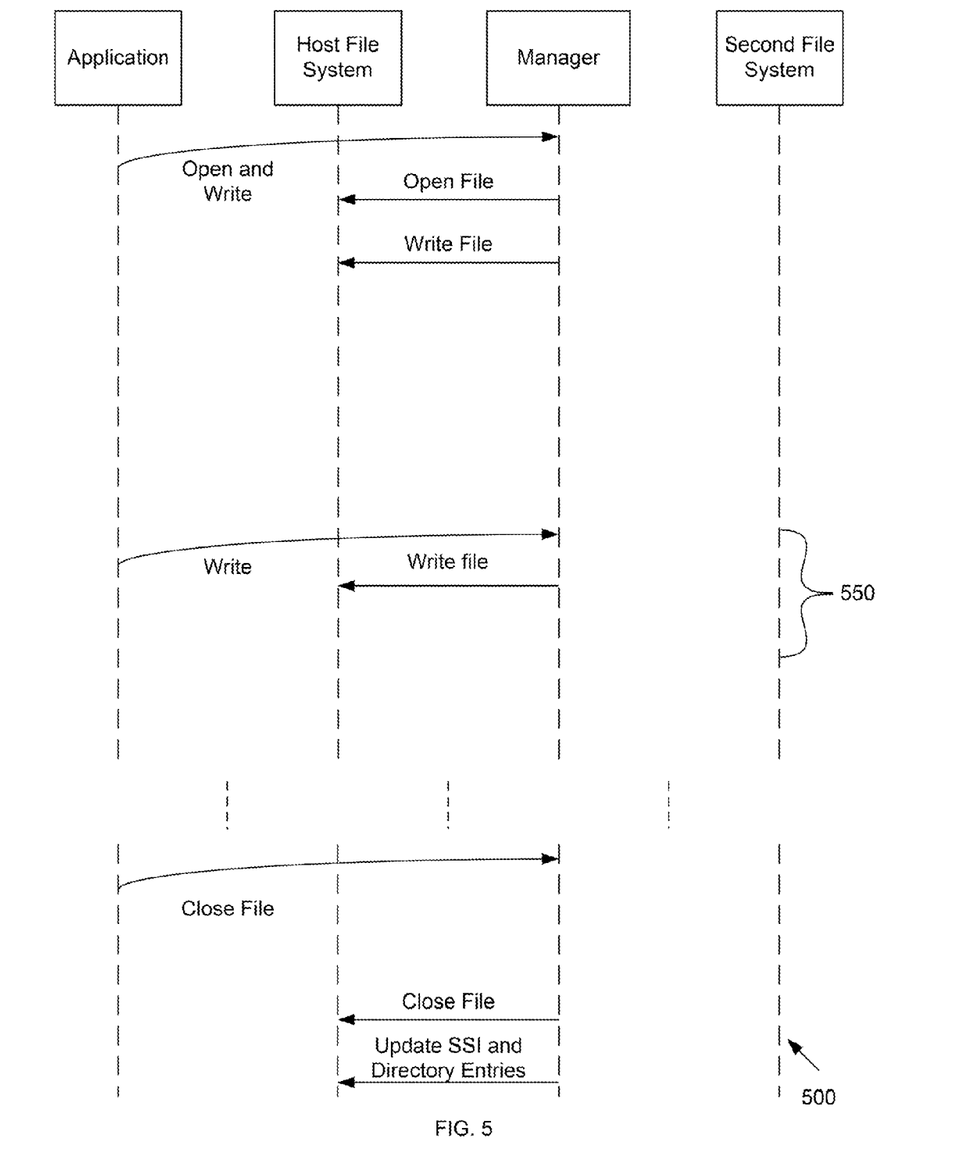
FIG. 5 shows an exemplary sequence of software function calls when a host file system is used to perform a write operation in a system with a second parallel file system.

FIG. 5 shows exemplary sequence 500 of software function calls when a host file system 110 is used to perform a write operation, in a system with a second parallel file system. The system 100 of FIG. 1 also supports file I/O operations that only utilize the host file system 110, and do not utilize the second file system 120. Such operations may occur when a file I/O operation does not require file I/O functionality only supported by a second file system 120.

As will be shown in the description accompanying FIG. 5, in one embodiment, file I/O operations utilizing the host file system 110 in the system maintain similar efficiency to systems that only contain a single file system. The efficiency is maintained because the embodiment may eliminate the need to copy the host cached file system storage system index 112 to the second cached file system allocation table 122 during write operations.

Referring briefly to FIG. 1, an application 102 may send file I/O requests directly to the host file system 110. Alternatively, an application 102 may also sent file I/O requests to the manager 104, which may in turn send requests to the host file system 110 after determining that the file I/O request does not require file I/O functionality only supported by a second file system 120.

Returning to FIG. 5, an application such as the application 102 of FIG. 1 sends a request to the manager, such as the manager 104 in FIG. 1, to open a file for a write operation. The request may be sent in the form of a function call. The manager 104 may evaluate the request and determine that the request only requires the use of the host file system 110.

The manager 104 sends a request to the host file system 110 to open the file, or create the file and then open the created file if the file does not already exist. The manager 104 then sends a request to write the file. If the application sends an additional request to write data to the file, the manager 104 may direct the host file system 110 to write the file again, without closing or re-opening the file.

Unlike the write operations performed by the second file system 120 in FIG. 4, each file write operation performed by the host file system 110 in FIG. 5 may cause the host file system's cache 112 of the storage system index and directory information to be updated, because the file may be dynamically resized by the host file system 110 to accommodate additional data. However, if the second file system 120 does not access the storage system 140 while the sequence 500 is in progress, the manager 104 does not have to send a request to the host file system 110 to copy the updated storage system index and directory information to the storage system's storage system index 142. The copy operation may be scheduled by the manager 104 or the host file system 110, for example, to take place after a certain number of completed write operations. The update interval selected will depend on the desired efficiency of the system 100.

The application may then send a close file request to the manager 104 once the file write operations 550 are completed. The manager 104 will then direct the host file system 110 to close the file. The manager 104 may instruct the host file system 110 to flush the updated cached information to the storage system 140 after the file is closed, if the file closure operation does not trigger this automatically.

While not shown in FIG. 5, the manager 104 may also utilize the host file system 110 to perform read operations. The application may send a read request directly to the host file system 110, or to the manager 104. If the request is sent to the manager 104, the manager 104 then may send a read request to the host file system 110 after determining that the file I/O request does not require file I/O functionality only supported by a second file system 120. As in the write case, the second cached storage system index 122 should not need to be updated for the duration of the read operation sequence.

Figure 6:
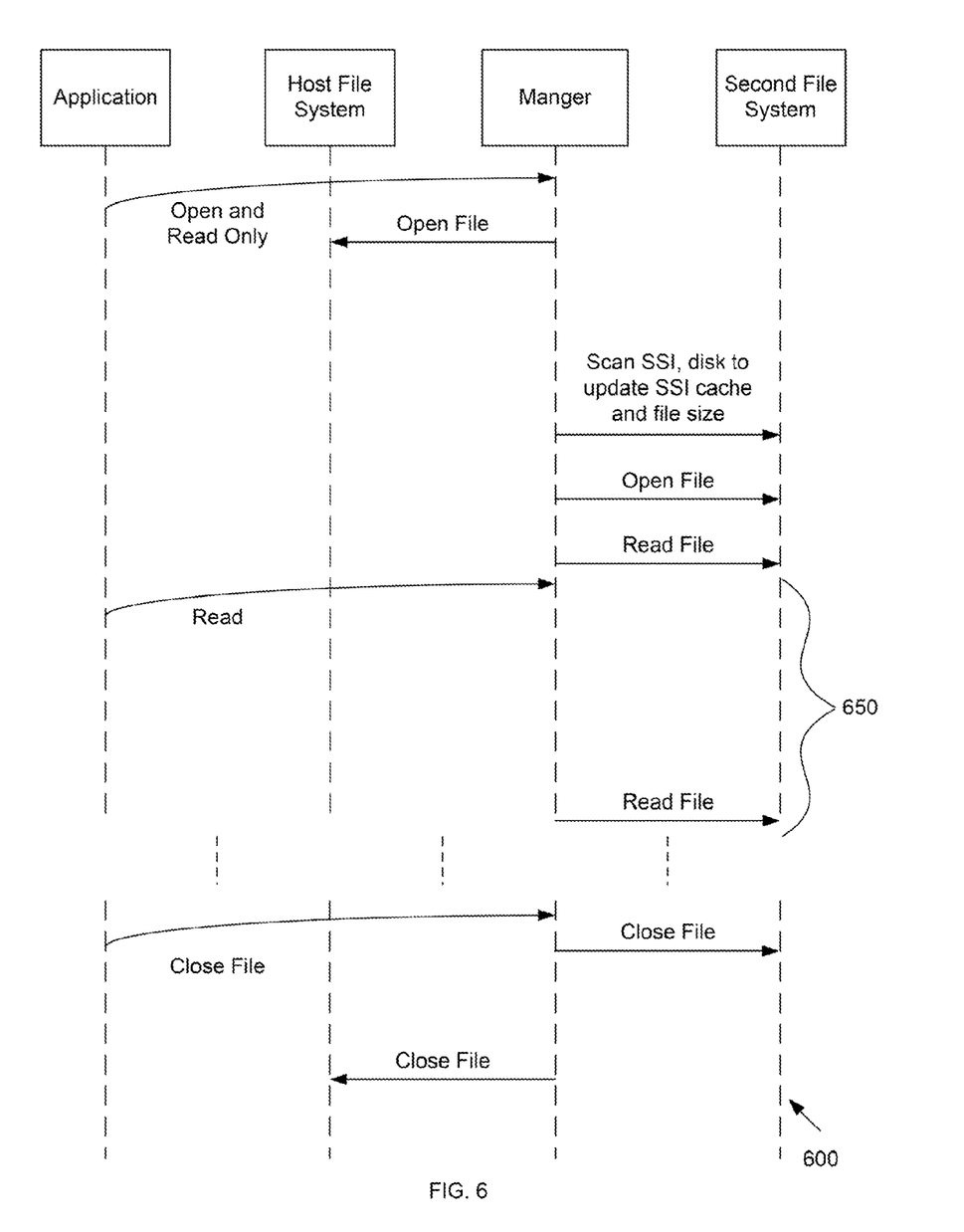
FIG. 6 shows an exemplary sequence of software function calls when a second file system is used to perform a read-only operation of a storage system.

FIG. 6 shows exemplary sequence 600 of software function calls when a second file system 120 is used to perform a read-only operation of a storage system 140.

The system 100 of FIG. 1 supports read file I/O operations utilizing the second file system 120, without utilizing the host file system 110. Such operations may occur when a read-only file I/O operation is requested. In this situation, the host file system 110 is not needed to extend or truncate the file accessed by the second file system 120.

As will be shown in the description accompanying FIG. 6, in one embodiment, read-only file I/O operations utilizing the second file system 120 in the system maintain similar efficiency to systems that only contain a single file system. The efficiency is maintained because the second file system's cached storage system index 122 may be updated only once during the sequence 600 of read operations.

An application such as the application 102 of FIG. 1 sends a request to the manager, such as the manager 104 in FIG. 1, to open a file for a read-only operation. The request may be sent in the form of a function call. Referring briefly to FIG. 1, an application 102 may directly access the host file system 110. Additionally, in some systems, the manager 104 may simultaneously support access requests by the host file system 110 and the second file system 120. In these situations, the sequence 600 should prevent the host file system 110 from being able to delete the file while it is being read utilizing the second file system 120. In one embodiment, the host file system 110 may be blocked from deleting a file that is open. Thus, the manager 104 may first open the file using the host file system 110. The manager 104 then sends a request to the second file system 120 to update its cache 122 of the storage system index and directory information from the storage system 140. In the sequence 600, it is assumed that the storage system 140 contains current information, because the host file system 110 flushes the host's cached storage system index 112 and directory information to the storage system 140 at the completion of a write operation, such as the step 318 of FIG. 3.

Once the second file system's cached storage system index 122 and directory information is updated, the manager 104 directs the second file system 120 to open the file, and to read the file. The manager 104 may pass other configuration information to the second file system 120, such as parameters that are needed to configure the encryption/decryption engine 124 of FIG. 1, when calling the open file or read file functions. If the application sends additional requests to read data from the file, the manager 104 may direct the host file system 110 to read data from the file again, without closing or re-opening the file.

If the host file system 110 does access the storage system 140 while the sequence 600 is in progress, the manager 104 does not have to send additional requests to the second file system 120 to copy the storage system index and directory information to the storage system storage system index 142. Depending on the amount of file data read from the storage system 140 relative to the amount of data transferred to update the storage system index and directory information, an application file read utilizing the second file system 120 can approximate the read efficiency of a system containing a single file system.

The application may then send a close file request to the manager 104 once the file read operations 650 are completed. The manager 104 will then instruct the second file system 120 to close the file. If the file was also opened utilizing the host file system 110 in order to prevent its deletion by the host file system, then the manager also instructs the host file system 110 to close the file.

The method described herein may be implemented within a variety of secure storage architectures. For example, a system 100 utilizing a host file system 110 and second file system 120 may be utilized when performing unencrypted and encrypted write and read operations to a TrustedFlash™ memory device from SanDisk Corporation of Milpitas, Calif., in accordance with TrustedFlash™ protocols. TrustedFlash™ refers in part to the creation, organization, and management of secure storage within a memory device.

Another aspect of implementing a secure system in accordance with TrustedFlash™ protocols, where a system comprises a host and a memory device with the TrustedFlash™ architecture, is the transmission of data between the host and the memory device. In accordance with TrustedFlash™ protocols, some data transmitted between the host and the memory device must be encrypted, to prevent the data from being intercepted and read by an unauthorized party. The encrypted data may include digital content to be securely stored to or read from the TrustedFlash™ memory device, such as MP3 format audio files, picture files, and video files. When such data is being stored within a secure partition of a TrustedFlash™ memory device, or stored in a protected format within a public partition, the host may encrypt the data before transmission to the device, and the memory device may decrypt the data and perform other operations before storage. When reading such data stored in a secure partition of the TrustedFlash™ memory device, or stored in a protected format in a public partition of the TrustedFlash™ memory device, the memory device may encrypt the data before transmission to the host, and the host may decrypt the received data. The encryption and decryption key utilized to perform the encryption and decryption operations may be referred to as a session key, and may be generated and utilized by both the host and non-volatile memory device for one or more read and write accesses.

Some writes to a TrustedFlash™ memory device do not require encryption before transmission from the host to the memory device, and some of the data received from the memory device during a read operation is not encrypted. Examples of unencrypted data include File Allocation Table (FAT) data, directories, and data stored in an unprotected format within the non-secure areas of the memory device, such as the public storage partition of a TrustedFlash™ memory device. In contrast, other accesses to secure partitions of a TrustedFlash™ memory device, and accesses to write and read data in a protected format, may require encryption of data being written to the memory device, and decryption of the data read from the memory device.

Thus, in a host system accessing a storage system 140 that is a TrustedFlash™ memory device, a host file system 110 may be utilized to write and read unencrypted data to and from the TrustedFlash™ memory device, without utilizing the second file system 120. In order to read encrypted data, a second file system 120, also referred to as a TrustedFlash™ file system, may update its cache of the storage system index 122 in the TrustedFlash™ memory device, and perform reads without assistance from the host file system 110, as described the sequence 600 in FIG. 6. Other configuration information may be passed through the second file system 120, such as parameters to configure the encryption/decryption engine 124 of FIG. 1. A manager, such as the manager 104 of FIG. 1, may be utilized to receive requests from an application 102, determine if encrypted read/write functions are requested, and call the necessary functions of the host file system 110 and second file system 120 in order to complete the application request.

In order to write encrypted data, a second file system 120 may utilize a host file system 110 to open or create a new file, extend the file in preparation for writing new data, and truncate and close the file after a write operation is complete. The second file system 120 may be utilized to perform the actual write of data to the file. Configuration information may be passed through the second file system 120, such as parameters to configure the encryption/decryption engine 124 of FIG. 1, so that the data is encrypted before being written to the storage system 140.

Supplementing a host file system 110 with a second file system 120 avoids the difficulty of developing a new host file system 110 that implements all of the required functionality of both the existing host file system 110 and the second file system 120. Thus, a manager 104, second file system 120, encryption/decryption engine 124, and storage system interface driver 130 may be more easily ported between hosts utilizing different file systems.

A potential inefficiency associated with operating two file systems 110, 120 in parallel is the synchronization of the cached storage system indexes 112, 122 stored within each file system, and the storage system index 142 stored in the storage system 140 itself. Without synchronization, a storage system 140 may be corrupted by a write operation utilizing an obsolete cached copy of the storage system index. On the other hand, synchronization operations may decrease data throughput because of the need to copy storage system index information between the storage system 140 and the cached copy of the storage system index stored within each file system.

The embodiments allow the host file system 110 to utilize its cached storage system index 112 without risk of it being obsolete, because the second file system 120 does not perform any file I/O operations that could obsolete the host's cached copy 112 of the storage system index. This eliminates the need for synchronization when write and read operations are performed using only the host file system 110, improving the performance of these operations. In order to do this, the host file system 110 performs many operations on behalf of the second file system 120. Operations that trigger a change in a storage system index, such as file creation, file deletion, file extension, and file truncation operations are performed by the host file system 110, on behalf of the second file system 120.

When the second file system 120 is utilized to write data, the host file system 110 extends the size of the file to allow new data to be written to the file. After the extension operation, the second file system 120 must synchronize its cached storage system index 122 with the host's cached storage system index 112. The overhead of this synchronization operation may be reduced (relative to the amount of data written) by selecting a file extension size sufficient to accommodate most or all of the data to be written by the second file system 120 while the file is opened.

When the second file system 120 is utilized to read data, the second file system 120 must synchronize its cached storage system index 122 with the host's cached storage system index 112 before opening the file. The overhead of this synchronization operation may be reduced (relative to the amount of data read) by reading more data from the file each time it is opened.

In one embodiment, the host file system 110 is favored, and thus may have higher performance, because the host file system's cached storage system index 112 may not become obsolete because of file I/O operations utilizing the second file system 120. In another embodiment, the second file system 120 could be favored instead of the host, by utilizing the second file system 120 to perform all of the operations that would modify the storage system index, and requiring the host file system 110 to synchronize its cached storage system index 112 before performing a file I/O operation. The choice of which file system to favor depends on the performance requirements of the system. For example, if the file I/O performance of unencrypted data is more important, the host file system 110 could be favored. On the other hand, if the file I/O performance of encrypted data is more important, then the secondary file system could be favored.

Although the invention has been described with respect to various system and method embodiments, it will be understood that the invention is entitled to protection within the full scope of the appended claims.

The invention claimed is:

1. A method of processing a single access request using both a first file system and a second file system, one or more common functions being supported by both the first file system and the second file system, a second file system function being supported by the second file system but not by the first file system, the method comprising:
  in a host device processing the single access request indicative of a request to access a file in a storage device, the host device processing the single access request by:
    determining if the second file system function is needed to process the single access request; and
    in response to determining that the second file system function is needed to process the single access request:
      instructing the first file system to perform a file open function on the file identified in the single access request;
      before instructing the first file system to perform a file close function on the file identified in the single access request, instructing the second file system to perform the file open function on the file identified in the single access request;
      after the first file system is instructed to perform the file open function on the file identified in the single access request and after the second file system is instructed to perform the file open function on the file identified in the single access request, instructing the second file system to perform the second file system function;
      after the second file system is instructed to perform the second file system instruction, instructing the first file system to perform the file close function on the file identified in the single access request; and
      after the second file system is instructed to perform the second file system instruction, instructing the second file system to perform the file close function on the file identified in the single access request;
  wherein instructing both of the first file system and the second file system to perform the at least one of the one or more common functions is for synchronizing an aspect with regard to the file of the first file system with the second file system.

2. The method of claim 1, wherein the storage device is embedded in or is configured for removal from the host device.

3. The method of claim 1, wherein the single access request comprises one of a specific read request from a specific file in the storage device or a write request to the specific file on the storage device; and
  wherein, in response to determining that the second file system function is needed to process one of the specific read request or the specific write request to the storage device, instructing both the first file system and the second file system to perform an open function on the specific file responsive to the specific read request or to the specific write request.

4. The method of claim 1, wherein the second file system function comprises an encryption function.

5. The method of claim 1,
  wherein the first file system and the second file system support a file open function and a file close function; and
  wherein instructing both the first file system and the second file system to perform at least one of the one or more of the common functions comprises:
    instructing the first file system to perform the file open function on the file identified in the single access request;
    after instructing the first file system to perform the file open function on the file identified in the single access but before instructing the first file system to perform the file close function on the file identified in the single access request, instructing the second file system to perform the file open function on the file identified in the single access request;
    after the second file system is instructed to perform the file open function on the file identified in the single access request, instructing the first file system to perform the file close function on the file identified in the single access request; and
    after instructing the first file system to perform the file close function on the file identified in the single access request, instructing the second file system to perform the file close function on the file identified in the single access.

6. The method of claim 5, wherein the host device processes the single access request by instructing both the first file system and the second file system to perform the file open function on the file;
  wherein instructing both the first file system and the second file system to perform the file open function on the file comprises:
    instructing the first file system to perform the file open function on the file identified in the single access; and
    after instructing the first file system to perform the file open function on the file, instructing the second file system to perform the file open function on the file identified in the single access.

7. The method of claim 1, wherein the aspect of the first file system synchronized with the second file system comprises a cached copy of the storage system index, the storage system index comprising an index for data stored in the storage device.

8. The method of claim 1, further comprising:
  instructing the first file system to extend a size of the file;
  instructing the first file system to update a first cached storage system index associated with the first file system to reflect the extended size of the file;
  instructing the first file system to update the storage system index with information from the updated first cached storage system index;
  instructing the second file system to update a second cached storage system index associated with the second file system with information from the updated storage system index;
  instructing the first file system to truncate the file; and
  instructing the first file system to close the file.

9. The method of claim 7, wherein one or more operations responsive to the single access request affect a cached storage system index;
  wherein the first file system is instructed to perform the one or more of the series of operations; and
  wherein the second file system is not instructed to perform the one or more of the series of operations.

10. The method of claim 9, Wherein the one or more operations comprises one or both of extending a file or creating a file.

11. The method of claim 1, wherein the storage device comprises a solid-state disk drive.

12. A host device configured to process a single access request using both a first file system and a second file system, one or more common functions being supported by both the first file system and the second file system, a second file system function being supported by the second file system but not by the first file system, the host device comprising:
a memory storing processor-executable instructions; and
a processor in communication with the memory, the processor configured to process a the single access request indicative of a request to access a file in a storage device by executing processor-executable access request instructions to:
determine if the second file system function is needed to process the access request;
in response to determining that the second file system function is needed to process the access request:
instruct both the first file system and the second file system to perform at least one of the one or more of the common functions on the file identified in the single access request in order for both the first file system and the second file system to perform the one or more common functions on the file responsive to the single access request; and
instruct the second file system to perform the second file system function,
wherein instructing both of the first file system and the second file system to perform the common function is for synchronizing an aspect of the first file system with the second file system.

13. The host device of claim 12, wherein the storage device is embedded in the host device or is configured for removal from the host device.

14. The host device of claim 12, wherein the single access request comprises one of a specific read request from a specific file in the storage device or a write request to the specific file on the storage device; and
wherein the processor is configured to, in response to determining that the second file system function is needed to process one of the specific read request or the specific write request to the storage device, instruct both the first file system and the second file system to perform an open function on the specific file responsive to the specific read request or to the specific write request.

15. The host device of claim 12, wherein the second file system function comprises an encryption function.

16. The host device of claim 12,
wherein the first file system and the second file system support a file open function and a file close function; and
wherein the processor is configured to instruct both the first file system and the second file system to perform at least one of the one or more of the common functions by:
instructing the first file system and the second file system to perform the file open function on the file identified in the single access request;
after instructing the first file system to perform the file open function on the file identified in the single access but before instructing the first file system to perform the file close function on the file identified in the single access request, instruct the second file system to perform the file open function on the file identified in the single access request;
after the second files system is instructed to perform the file open function on the file identifies in the single access, instruct the first file system to perform the file close function on the file identified in the single access request; and
after instructing the first file system to perform the file close function on the file identified in the single access request, instructing the second file system to perform the file close function on the file identified in the single access.

17. The host device of claim 16, wherein the processor is configured to processes the single access request to access the storage device by instructing both the first file system and the second file system to perform the file open function on the file;
wherein the processor is configured to instruct both the first file system and the second file system to perform the file open function on the file by:
instructing the first file system to perform the file open function on the file identified in the single access; and
after instructing the first file system to perform the file open function on the file, instructing the second file system to perform the file open function on the file identified in the single access.

18. The host device of claim 12, wherein the aspect of the first file system synchronized with the second file system comprises a cached copy of the storage system index, the storage system index comprising an index for data stored in the storage device.

19. The host device of claim 12, wherein the processor is further configured to:
instruct the first file system to extend a size of the file;
instruct the first file system to update a first cached storage system index associated with the first file system to reflect the extended size of the file;
instruct the first file system to update the storage system index with information from the updated first cached storage system index;
instruct the second file system to update a second cached storage system index associated with the second file system with information from the updated storage system index;
instruct the first file system to truncate the file; and
instruct the first file system to close the file.

20. The host device of claim 18, wherein one or more operations responsive to the single access request affect a cached storage system index;
wherein the processor is configured to instruct the first file system to perform the one or more of the series of operations; and
wherein the processor is configured not to instruct the second file system to perform the one or more of the series of operations.

21. The host device of claim 20, wherein the one or more operations comprises one or both of extending a file or creating a file.

22. A host device for processing a single access request indicative of a request to access a file in a storage device using both a first file system and a second file system, one or more common functions being supported by both the first file system and the second file system, a second file system function being supported by the second file system but not by the first file system, the host device comprising:

means for determining that the second file system function is needed to process the single access request;
means for instructing the first file system to perform a file open function on the file identified in the single access request;
means for before instructing the first file system to perform a file close function on the file identified in the single access request, instructing the second file system to perform the file open function on the file identified in the single access request;
means for after the first file system is instructed to perform the file open function on the file identified in the single access request and after the second file system is instructed to perform the file open function on the file identified in the single access request, instructing the second file system to perform the second file system function;
means for after the second file system is instructed to perform the second file system instruction, instructing the first file system to perform the file close function on the file identified in the single access request; and
means for after the second file system is instructed to perform the second file system instruction, instructing the second file system to perform the file close function on the file identified in the single access request;
wherein instructing both of the first file system and the second file system to perform the at least one of the one or more common functions is for synchronizing an aspect with regard to the file of the first file system with the second file system.

23. The host device of claim 22, wherein the storage device is embedded in or is configured for removal from the host device.

24. The host device of claim 22, wherein the storage device comprises a solid-state disk drive.

* * * * *